(12) United States Patent
Liu et al.

(10) Patent No.: US 11,629,952 B2
(45) Date of Patent: Apr. 18, 2023

(54) DETECTION AIDED TWO-STAGE PHASE UNWRAPPING ON PATTERN WAFER GEOMETRY MEASUREMENT

(71) Applicant: KLA Corporation, Milpitas, CA (US)

(72) Inventors: Helen Liu, Fremont, CA (US); Guoqing Zhang, Senja Road (SG); Hui Li, Oleander Towers (SG)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 17/825,718

(22) Filed: May 26, 2022

(65) Prior Publication Data

US 2022/0390862 A1 Dec. 8, 2022

Related U.S. Application Data

(60) Provisional application No. 63/195,716, filed on Jun. 2, 2021.

(51) Int. Cl.
*G01B 11/02* (2006.01)
*G01B 11/24* (2006.01)

(52) U.S. Cl.
CPC ............................. *G01B 11/2441* (2013.01)

(58) Field of Classification Search
CPC ............ G01B 11/2441; G01B 11/0608; G01B 9/02078
See application file for complete search history.

(56) References Cited

U.S. PATENT DOCUMENTS

| | | | |
|---|---|---|---|
| 9,632,038 B2 | 4/2017 | Chen et al. | |
| 9,865,047 B1 * | 1/2018 | Chen | G06V 10/42 |
| 10,352,691 B1 * | 7/2019 | Chen | G01B 11/2441 |
| 11,035,665 B2 | 6/2021 | Liu et al. | |
| 2013/0182262 A1 * | 7/2013 | Tang | G01B 9/02076 356/503 |
| 2016/0321799 A1 * | 11/2016 | Chen | G01B 11/06 |
| 2017/0241764 A1 * | 8/2017 | Liu | G01B 9/02083 |
| 2021/0033386 A1 * | 2/2021 | Liu | G01B 11/2441 |

FOREIGN PATENT DOCUMENTS

WO 2019222614 A1 11/2019

OTHER PUBLICATIONS

International Search Report and Written Opinion in Application No. PCT/US2022/031859 dated Sep. 8, 2022, 6 pages.

* cited by examiner

*Primary Examiner* — Michael A Lyons
*Assistant Examiner* — Jonathon Cook
(74) *Attorney, Agent, or Firm* — Suiter Swantz pc llo

(57) ABSTRACT

Systems and methods for unwrapping a phase map are disclosed. Such systems and methods may include receiving a wrapped phase map associated with an interferometric measurement of a sample including patterned features; removing a tilt from the wrapped phase map; generating a background; detecting features in the wrapped phase, the features in the wrapped phase map corresponding to least some of the patterned features of the sample; replacing phases of the features with the background at corresponding locations in the wrapped phase map; unwrapping the modified wrapped phase map using a global phase-unwrapping; applying local phase-unwrapping to restore the phases of the features; and reapplying the tilt to generate an output unwrapped phase map.

24 Claims, 13 Drawing Sheets

US 11,629,952 B2

DETECTION AIDED TWO-STAGE PHASE UNWRAPPING ON PATTERN WAFER GEOMETRY MEASUREMENT

CROSS-REFERENCE TO RELATED APPLICATION

The present application claims the benefit under 35 U.S.C. § 119(e) of U.S. Provisional Application Ser. No. 63/195,716 filed on Jun. 2, 2021, which is incorporated herein by reference in the entirety.

TECHNICAL FIELD

The present disclosure relates generally to phase unwrapping of patterned semiconductor device measurements and, more particularly, to systems and methods for detection aided two-stage phase unwrapping of patterned semiconductor device measurements.

BACKGROUND

Metrology processes are used at various steps during a semiconductor manufacturing process to monitor and control one or more semiconductor layer processes. Some of these characteristics include the flatness and thickness uniformity of samples (e.g., wafers). An interferometry tool may be used to generate a wrapped phase map of a sample with high precision. For example, a Patterned Wafer Geometry (PWG) tool may be used in-process.

Interferometry is a technique which uses the interference of superimposed electromagnetic waves to extract information (e.g., interference patterns) that may correspond to extremely precise measurements of surface topology of a sample. However, such information (e.g., phase data, interferograms, wrapped phase maps, and the like) obtained utilizing an interferometry tool may span more than one phase cycle. For example, as the surface topology changes in height, the values of the measured interference pattern may span multiple phases cycles with the range of each cycle being between —pi and +pi such that a value at any given point on a wrapped phase map does not map specifically to an absolute height value. In this regard, the values across an increasing/decreasing surface topology may cyclically repeat across multiple phase cycles and repeated values of different phase cycles are identical such that it is ambiguous before phase unwrapping as to which phase cycle a particular value belongs and how many phase cycles there are.

Phase unwrapping may be utilized in an attempt to resolve these phase ambiguities of a wrapped phase map. However, generally, as the complexity and magnitude of variations of the surface topology increases, accurately solving for the phase ambiguities becomes increasingly challenging.

SUMMARY

A metrology system is disclosed, in accordance with one or more embodiments of the present disclosure. In one illustrative embodiment, the system includes a controller communicatively coupled to an interferometry tool. In another illustrative embodiment, the controller includes one or more processors and memory. In another illustrative embodiment, the memory is configured to store a set of program instructions. In another illustrative embodiment, the one or more processors are configured to execute program instructions causing the one or more processors to receive a wrapped phase map associated with an interferometric measurement of a sample including patterned features. In another illustrative embodiment, the one or more processors are configured to execute program instructions causing the one or more processors to remove a tilt from the wrapped phase map. In another illustrative embodiment, the one or more processors are configured to execute program instructions causing the one or more processors to generate a background. In another illustrative embodiment, the one or more processors are configured to execute program instructions causing the one or more processors to detect features in the wrapped phase map, wherein the features in the wrapped phase map correspond to at least some of the patterned features of the sample. In another illustrative embodiment, the one or more processors are configured to execute program instructions causing the one or more processors to replace phases of the features with the background at corresponding locations in the wrapped phase map to generate a modified wrapped phase map. In another illustrative embodiment, the one or more processors are configured to execute program instructions causing the one or more processors to unwrap the modified wrapped phase map using a global phase-unwrapping to generate a temporary unwrapped phase map. In another illustrative embodiment, the one or more processors are configured to execute program instructions causing the one or more processors to apply local phase-unwrapping to restore the phases of the features of the temporary unwrapped phase map at the corresponding locations. In another illustrative embodiment, the one or more processors are configured to execute program instructions causing the one or more processors to reapply the tilt to the temporary unwrapped phase map to generate an output unwrapped phase map.

A metrology method is disclosed, in accordance with one or more embodiments of the present disclosure. In one illustrative embodiment, the method may include, but is not limited to, receiving a wrapped phase map associated with an interferometric measurement of a sample including patterned features. In one illustrative embodiment, the method may include removing a tilt from the wrapped phase map. In one illustrative embodiment, the method may include generating a background. In one illustrative embodiment, the method may include detecting features in the wrapped phase, wherein the features in the wrapped phase map correspond to at least some of the patterned features of the sample. In one illustrative embodiment, the method may include replacing phases of the features with the background at corresponding locations in the wrapped phase map to generate a modified wrapped phase map. In one illustrative embodiment, the method may include unwrapping the modified wrapped phase map using a global phase-unwrapping to generate a temporary unwrapped phase map. In one illustrative embodiment, the method may include applying local phase-unwrapping to restore the phases of the features of the temporary unwrapped phase map at the corresponding locations. In one illustrative embodiment, the method may include reapplying the tilt to the temporary unwrapped phase map to generate an output unwrapped phase map.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

DETAILED DESCRIPTION

Figure 1A:
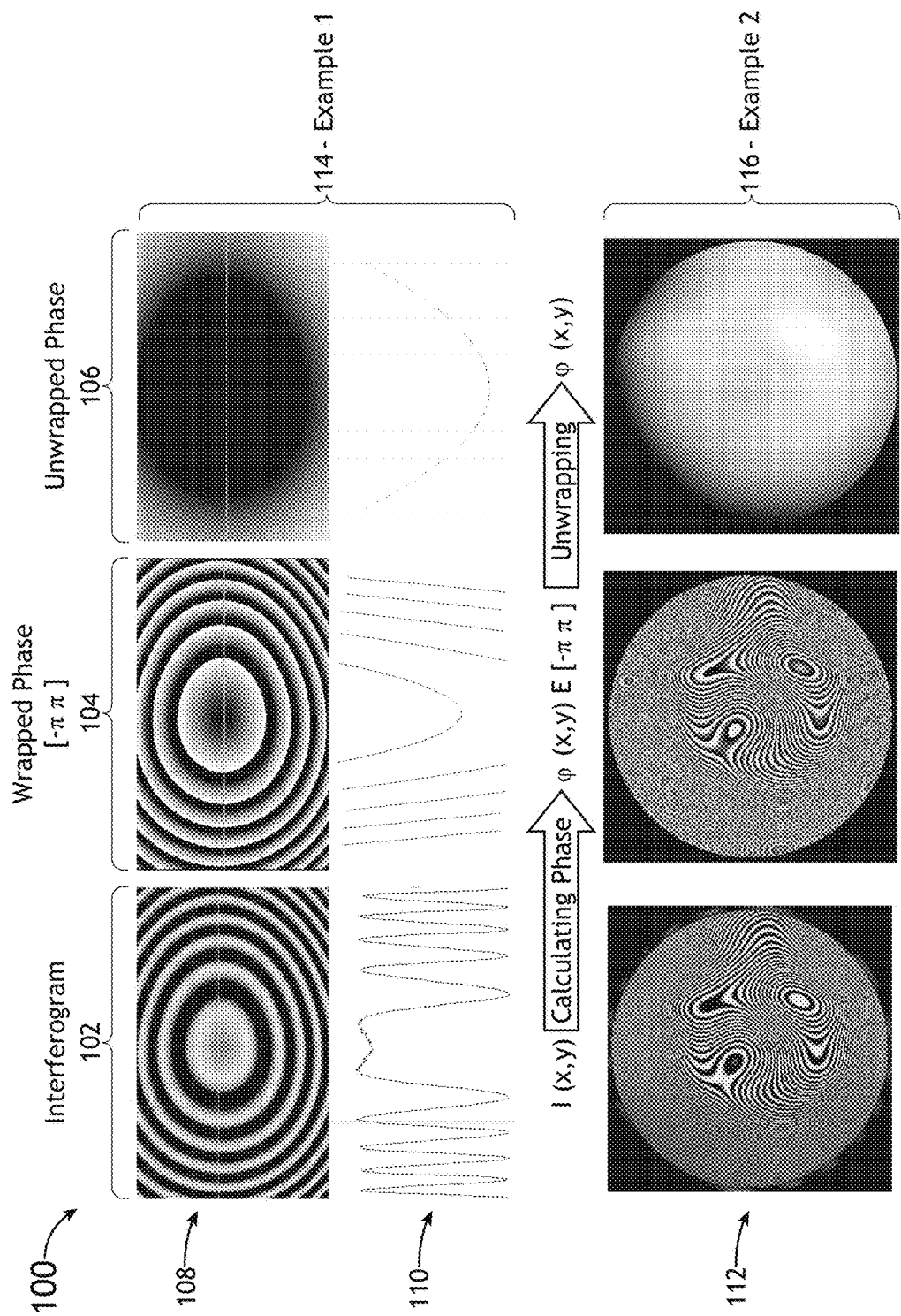
FIG. 1A illustrates a process diagram for generating an unwrapped phase map, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Some embodiments of the present disclosure are directed to systems and methods for two-stage phase unwrapping of wrapped phase maps in the presence of features with sharp, rapidly-varying profiles. For example, a two-stage phase unwrapping technique may identify a smoothly-varying background signal based on prior knowledge of a sample, temporarily remove detected features having sharp profiles, replace the removed features with the background signal, perform a first phase unwrapping step on the wrapped phase map having the features replaced, and then restore the features with a second phase unwrapping step. In this way, any suitable phase unwrapping technique may be used in the first phase unwrapping step to accurately perform global phase unwrapping across the sample based on the background signal without causing error from the features. The second phase unwrapping step may then restore informational content associated with the features through a local phase unwrapping technique without risk of causing errors to propagate through the other areas already unwrapped in the first phase unwrapping step.

Solving for patterned samples (e.g., wafers) is challenging using conventional techniques because patterned samples, especially with increasing use of relatively tall 3D NAND stacked memory features, may have many ambiguities that are difficult to solve for. The ambiguous values of a wrapped phase map may repeat cyclically. The values of a wrapped phase map represent an intensity between a light and dark value as an optical path difference between two arms of an interferometry tool and such intensity values may be represented by colored pixels for illustrative purposes. For instance, the value at a given point of a wrapped phase map may be identical to a value at a different point, even if those points on the sample have a different height. In a sense, this may mean that any given value may be "ambiguous." Such values may, in some embodiments, be "unwrapped" such that the data covers a single range. For example, unwrapped data may mean data that does not cyclically repeat.

It should be noted that "patterned samples", samples with "patterned features", and the like means samples that are not "blank" wafers that do not yet have layers of patterned devices (e.g., 3D NAND devices). It should also be noted that terms such as "features", "features 402", "sharp features", "tall features" and the like, as used in the present disclosure are not meant have exactly the same meaning as "patterned features". Although, it should be noted "features 402" and the like may include features that are a subset of patterned features. In some embodiments, "features 402" includes defects (e.g., particles, unexpected raised defects that cause discontinuities in measurements) that are not a subset of patterned features.

Accurately solving the ambiguity of values of a wrapped phase map by unwrapping is challenging using methods other than embodiments of the present disclosure when the surface topology of the sample changes sharply. For example, phase unwrapping techniques using conventional path tracing over the entire phase map may partially fail when trying to solve ambiguities of sharply changing surface topology heights if a value is attributed to the wrong phase cycle. For example, if such an incorrect attribution is made, then that error in attribution may propagate through the sample during an unwrapping process, increasing the size of the error.

In a general sense, path tracing is a phase unwrapping technique that makes assumptions such as an assumption that a value on one end of a phase cycle that happens to be near a value on the other end of a phase cycle means that the values are in adjacent phase cycles. Such an assumption may hold true for smoothly varying wrapped phase maps but is not necessarily true for sharply varying wrapped phase maps. For example, when a height difference between adjacent values of a wrapped phase map changes by more than a threshold (e.g., one half phase cycle, one full phase cycle, or the like), then an error of attribution of a value to the wrong phase cycle may be more likely to occur when unwrapping the phase map.

Further, phase unwrapping techniques using filtering and 2D optimization (e.g., 2D-weighted least-squares methods), such as preconditioned conjugate gradient (PCG) techniques, may be less accurate and/or less efficient than embodiments of the present disclosure. For example, a 2D optimization approach may not differentiate an area with sharp features from a non-challenging area, which may lead to introducing errors far away from the challenging areas. For example, errors may propagate from the area with sharp features to the non-challenging area when using path tracing unwrapping techniques. Such far away errors may be difficult to identify, and therefore difficult to solve for. Further, such techniques often use pseudo-thickness maps to determine a surface slope of the sample, and pseudo-thickness may introduce errors from a backside surface of the sample to the frontside surface. Further, as a technique becomes more robust (e.g., less error prone), then the processing time may increase, reducing efficiency.

Therein lies a need for a robust, accurate, and efficient method for resolving phase ambiguities when phase unwrapping.

The present disclosure, in at least some embodiments, addresses at least some of the drawbacks of previous phase unwrapping techniques, such as those described above. For example, as shown in FIGS. 1B and 1C, a more accurate unwrapped phase map 122 of FIG. 1C may be obtained using at least some embodiments of the present disclosure compared to a partially failed phase map 120 of FIG. 1B using other techniques. In another example, some embodiments of the present disclosure allow for reduced measurement error of surface topology heights and more wafer coverage on challenging layers with complicated height discontinuities. In another example, some embodiments allow for reduced measurement error for samples having non-uniform film thickness.

Figure 1C:
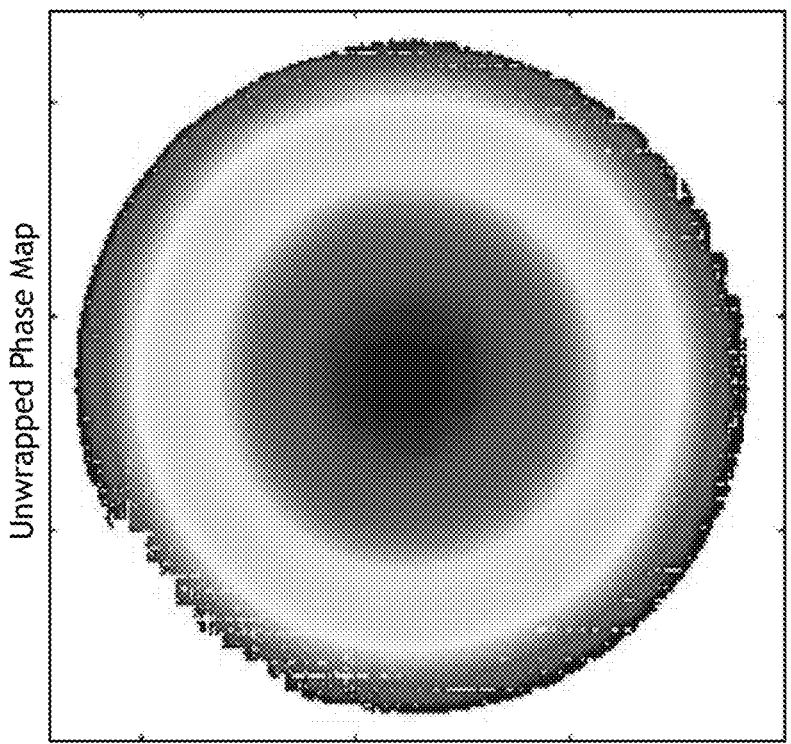
FIG. 1C illustrates an unwrapped phase wrap diagram, in accordance with one or more embodiments of the present disclosure.
Figure 1B:
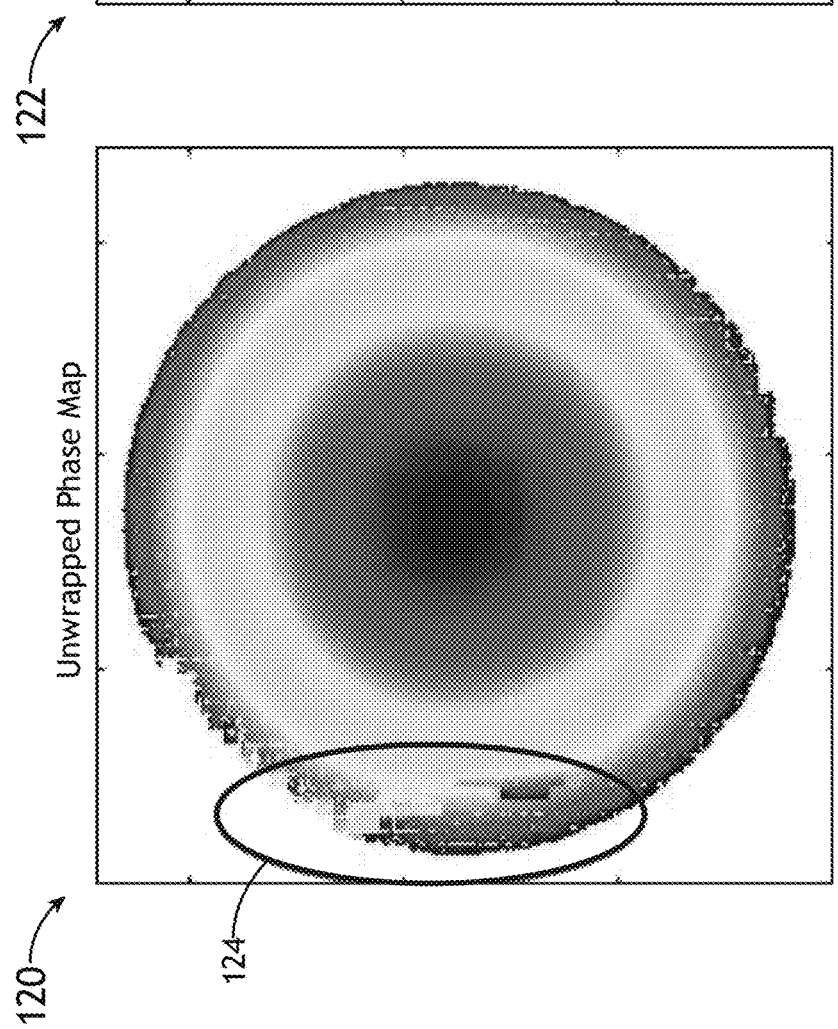
FIG. 1B illustrates a partially failed unwrapped phase wrap diagram.

FIG. 1A illustrates a process flow diagram depicting a method 100 of generating an unwrapped phase map, in accordance with one or more embodiments of the present disclosure.

FIG. 1A includes two examples of an unwrapping method 100 (Example 1-114, and Example 2-116) shown in an interferogram column 102, a wrapped phase column 104, and an unwrapped phase column 106. The first example, Example 1-114, may be an example of a zoomed example 114 of a zoomed-in portion of an interferogram and the second example, Example 2-116, may be a wafer example 116 of an unpatterned wafer sample in unpatterned wafer row 112. The interferogram column 102 includes interferograms of interferogram data, which may be interferometric measurement of a sample.

It should be noted that line plot row 110 may illustrate a plot of corresponding phase map row 108. For example, each plot in line plot row 110 may correspond to the phase map above it. For example, each line plot in line plot row 110 may represent a one-dimensional cross section of a horizontal line in a center of the phase map above each line plot. Note that there are no discontinuities in line plot of unwrapped phase column 106 because the data in the unwrapped phase column 106, unlike the data in the wrapped phase column 104, is not cyclically wrapped.

Note that, in some embodiments, a calculating phase step is performed to determine/generate a wrapped phase map based on an interferogram as shown. For example, raw sensor data obtained from an interferometry tool 214 may be represented in an interferogram. Such data may need to be processed in order to obtain a wrapped phase map.

Note that, in some embodiments, an unwrapping step is performed to determine/generate an unwrapped phase map 106 based on the wrapped phase map 104 as shown.

Figure 2:
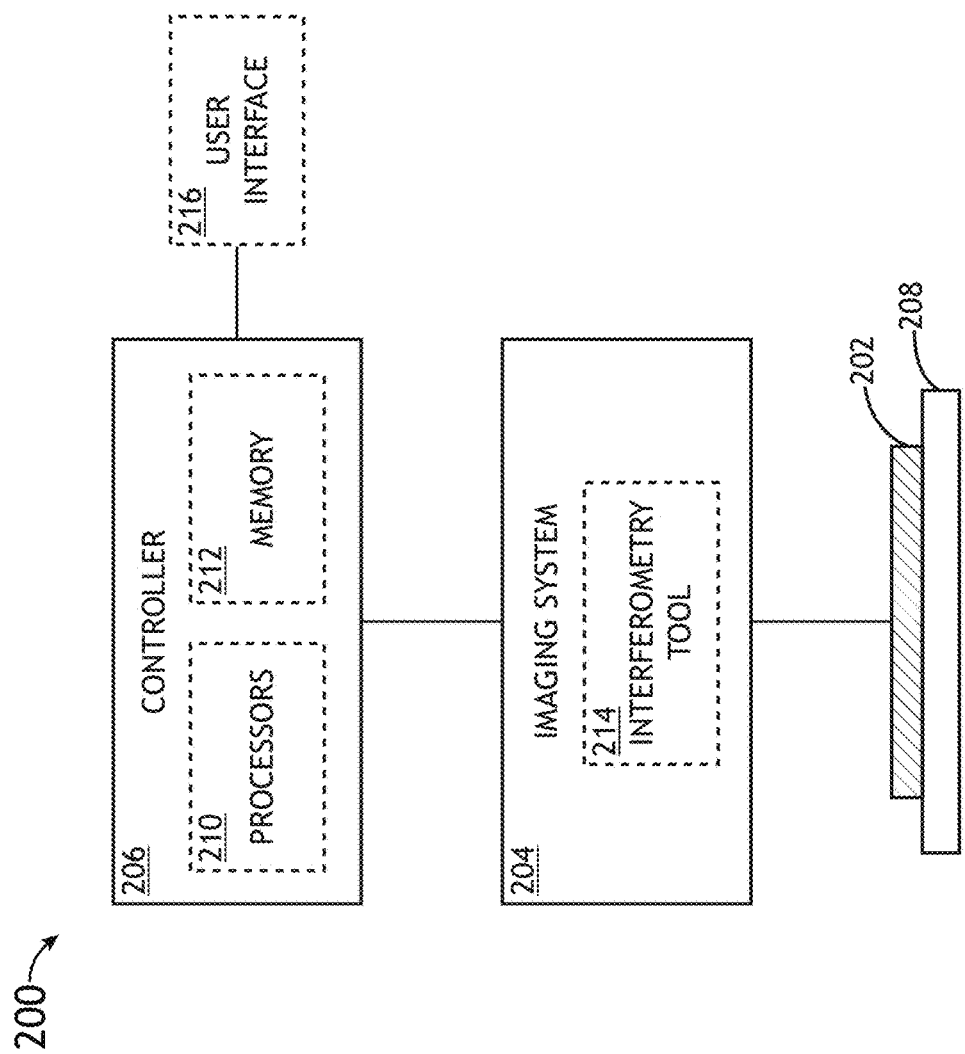
FIG. 2 illustrates a schematic block diagram of a system, in accordance with one or more embodiments of the present disclosure.

FIG. 2 illustrates a simplified schematic diagram of a system 200 for unwrapping a wrapped phase map 104, in accordance with one or more embodiments of the present disclosure.

The system 200 may be any system, such as a metrology system, for determining an unwrapped phase map 106 of a sample 202. Note that "system" throughout this disclosure may, but is not necessarily required to, mean a "metrology system" such that any description, element, method, and/or the like of a system 200 may be applicable to one or more embodiments of a metrology system 200. Note that a metrology system 200 may, but does not necessarily, include a tool for measuring a property of a sample 202. Such a tool may be an inspection tool, an interferometry tool 214, and the like. The system 200 may include, but is not limited to, an imaging system 204. The imaging system 204 may include, but is not limited to, one or more measurement tools (e.g., an interferometry tool 214). The system 200 may additionally include, a controller 206 including one or more processors 210, and a memory 212. In one embodiment, the controller 206 is communicatively coupled to the imaging system 204. In this regard, the one or more processors 210 of the controller 206 may be configured to generate one or more control signals configured to adjust one or more characteristics of the imaging system 204 according to a recipe. Further, the controller 206 may be configured to receive data including, but not limited to, interferometry data associated with the sample 202 from the interferometry tool 214.

Further, system 200 may include a sample stage 208 for positioning the sample 202 within a field of view of the imaging system 204 for the determination of a measurement. The sample stage 208 may include any system suitable for positioning the sample 202 within the system 200. For example, the sample stage 208 may include any combination of linear translation stages, rotational stages, tip/tilt stages or the like.

It is contemplated that the interferometry tool 214 may include, but is not limited to, any tool using interferometry measurement principles. For example, such a tool 214 may be any wafer geometry measurement system capable of measuring geometry of semiconductor wafers using interferometry. It is noted that the term wafer geometry may include wafer frontside height, backside height, thickness variation, flatness, and all consequent derivatives such as shape, shape-difference, nanotopography and the like. In some embodiments, the WaferSight Patterned Wafer Geometry (PWG) system from KLA Corporation may be utilized as the interferometry tool 214. Further examples include multiple interferometry tools 214, a Michelson interferometer, a Linnik interferometer, a Double Side Phase Shifting Fizeau interferometer, a surface-topology interferometer, and/or the like. It is to be understood, however, that other types of interferometry tools 214 may also be utilized without departing from the spirit and scope of the present disclosure.

In some embodiments, the interferometry tool 214 generates a wrapped phase map 104 based on interference of a reference beam with light reflected from a surface of the sample 202.

Figure 3:
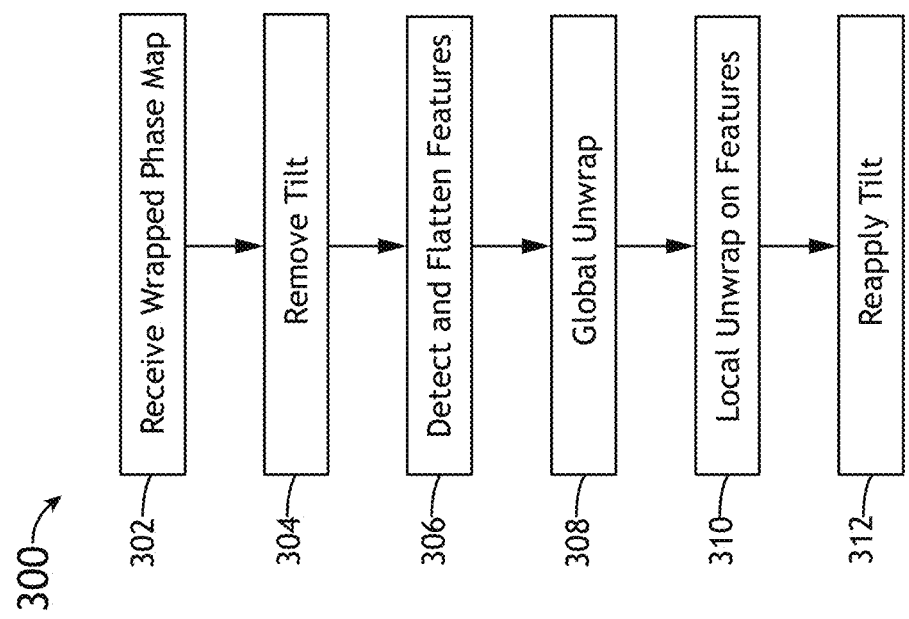
FIG. 3 illustrates a flow diagram of a method for unwrapping a phase map, in accordance with one or more embodiments of the present disclosure.

FIG. 3 illustrates a process flow diagram of a method 300 for unwrapping a phase map, in accordance with one or more embodiments of the present disclosure. Any system or combination of systems disclosed herein may carry out the steps of method 300. For example, one or more components of system 200 may perform one or more of the steps of method 300, as well as one or more additional steps.

Figure 4A:
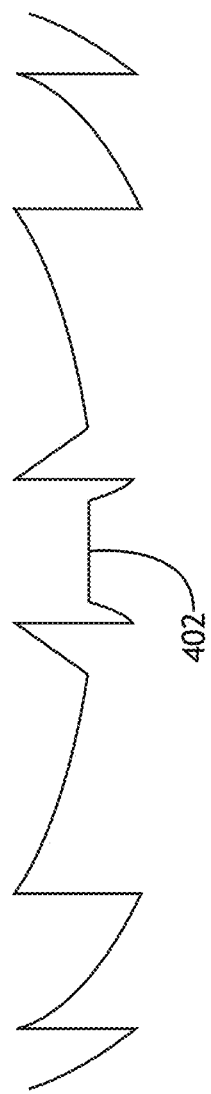
FIG. 4A illustrates a cross sectional view of a schematic diagram of a sample, in accordance with one or more embodiments of the present disclosure.
Figure 4B:
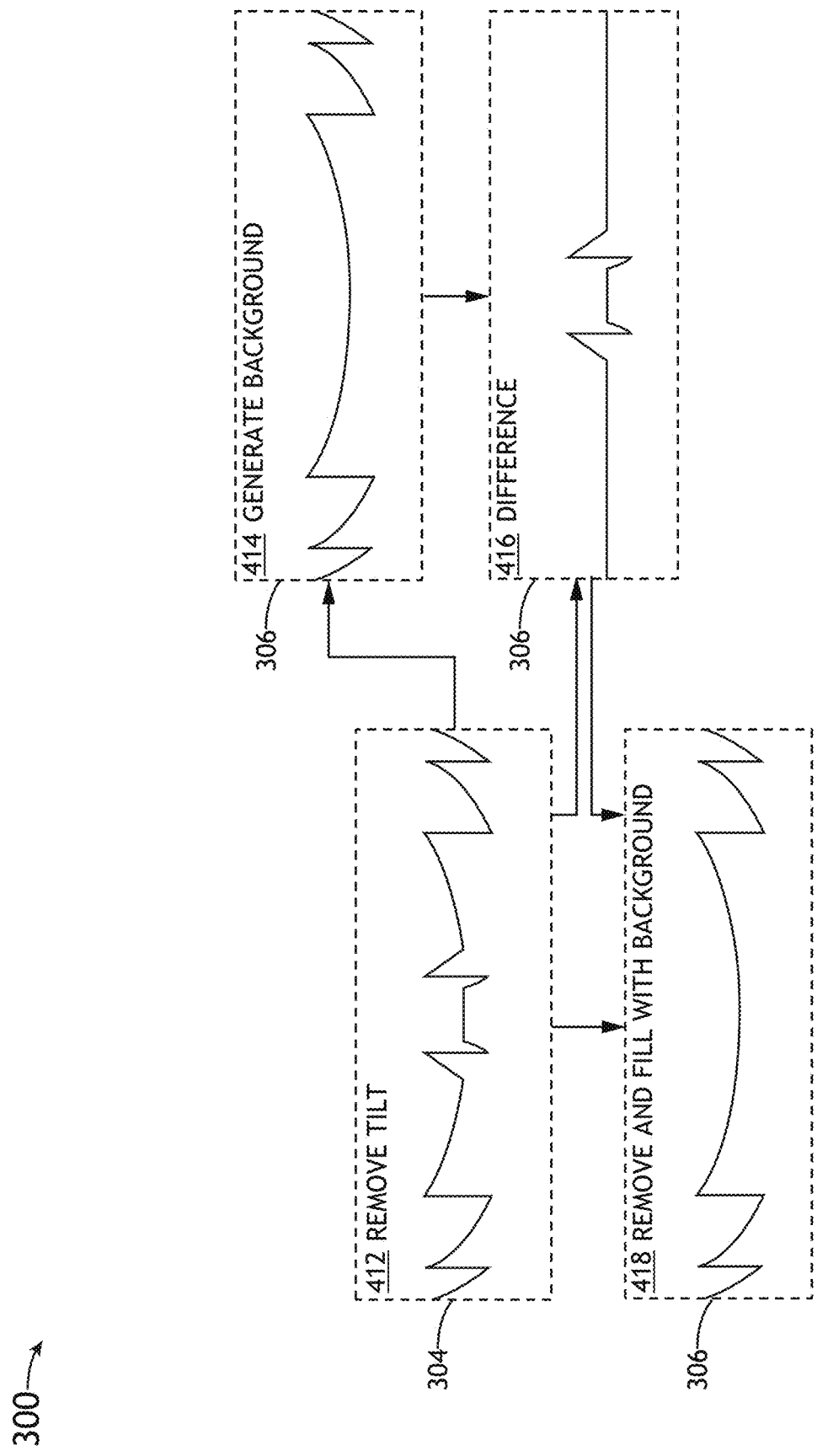
FIG. 4B illustrates a flow diagram including schematic diagrams of steps of a method for unwrapping a phase map, in accordance with one or more embodiments of the present disclosure.
Figure 4C:
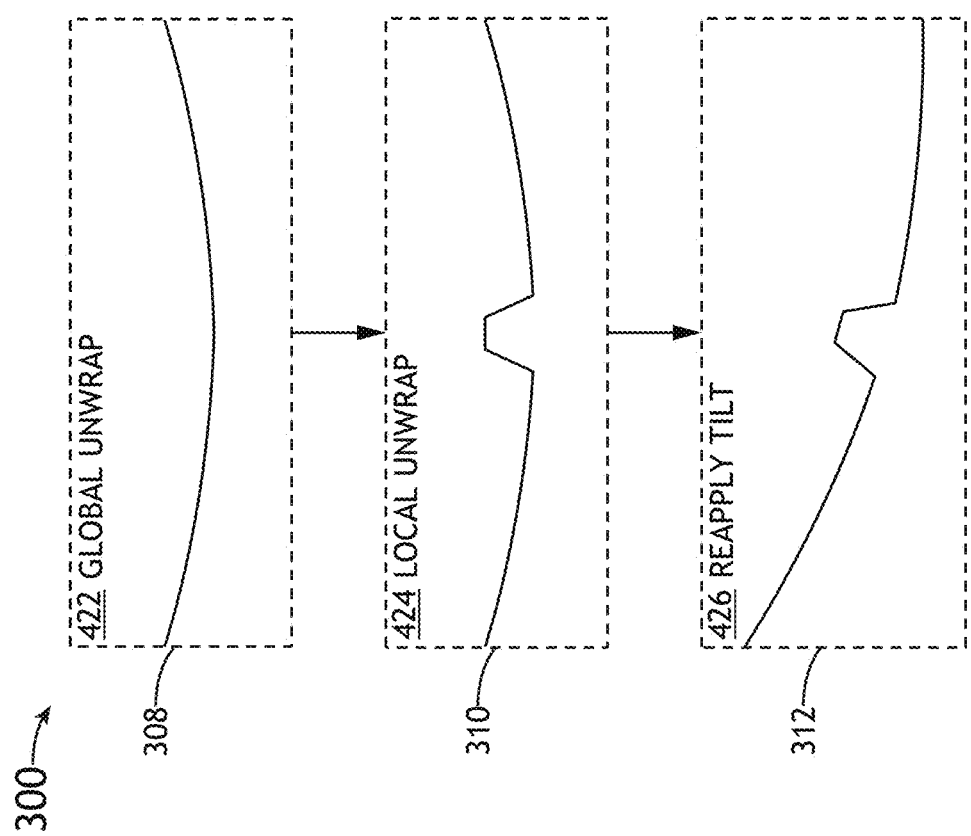
FIG. 4C illustrates a flow diagram including schematic diagrams of steps of a method for unwrapping a phase map, in accordance with one or more embodiments of the present disclosure.
Figure 5A:
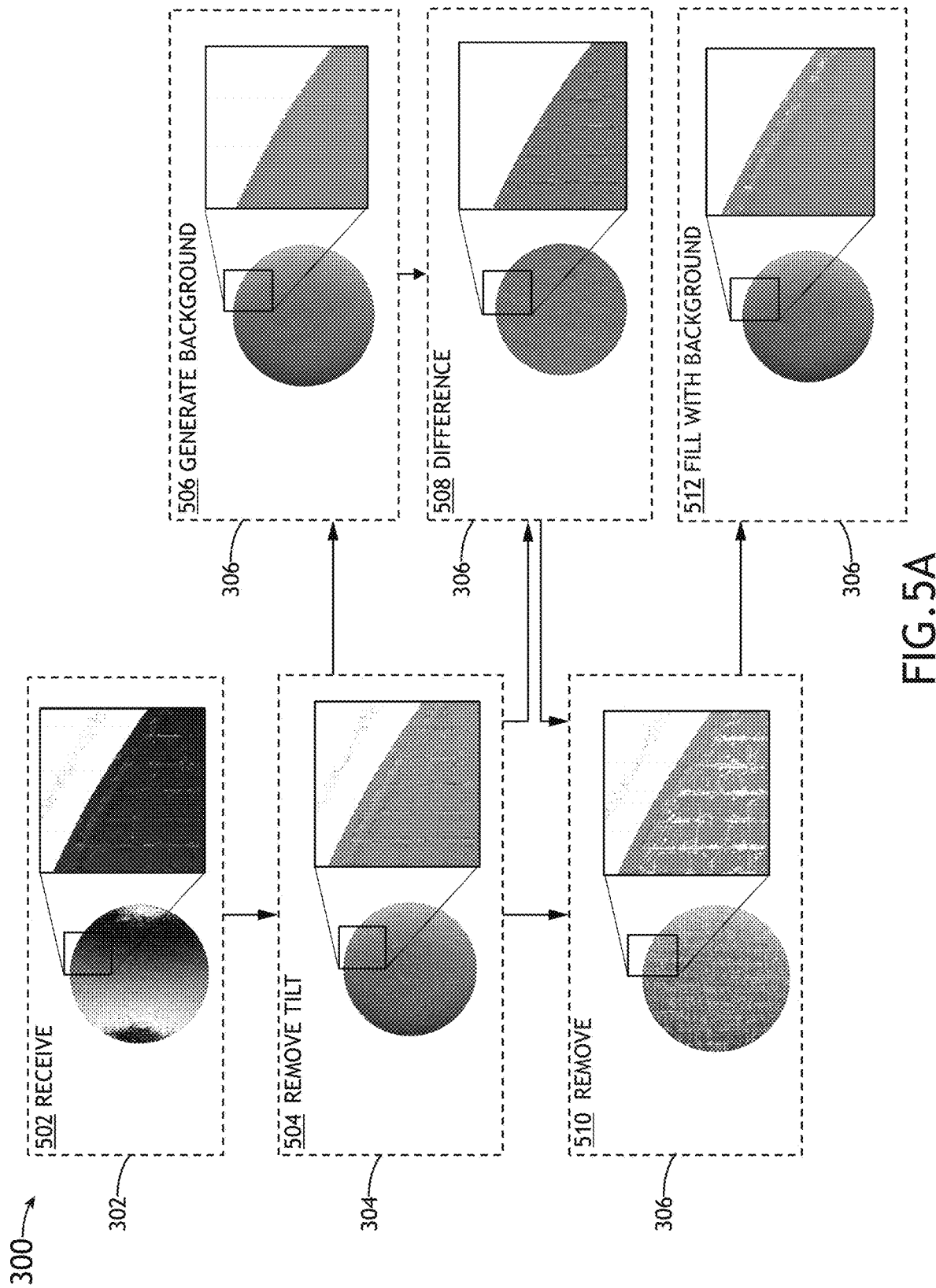
FIG. 5A illustrates a flow diagram including phase maps of steps of a method for unwrapping a phase map, in accordance with one or more embodiments of the present disclosure.
Figure 5B:
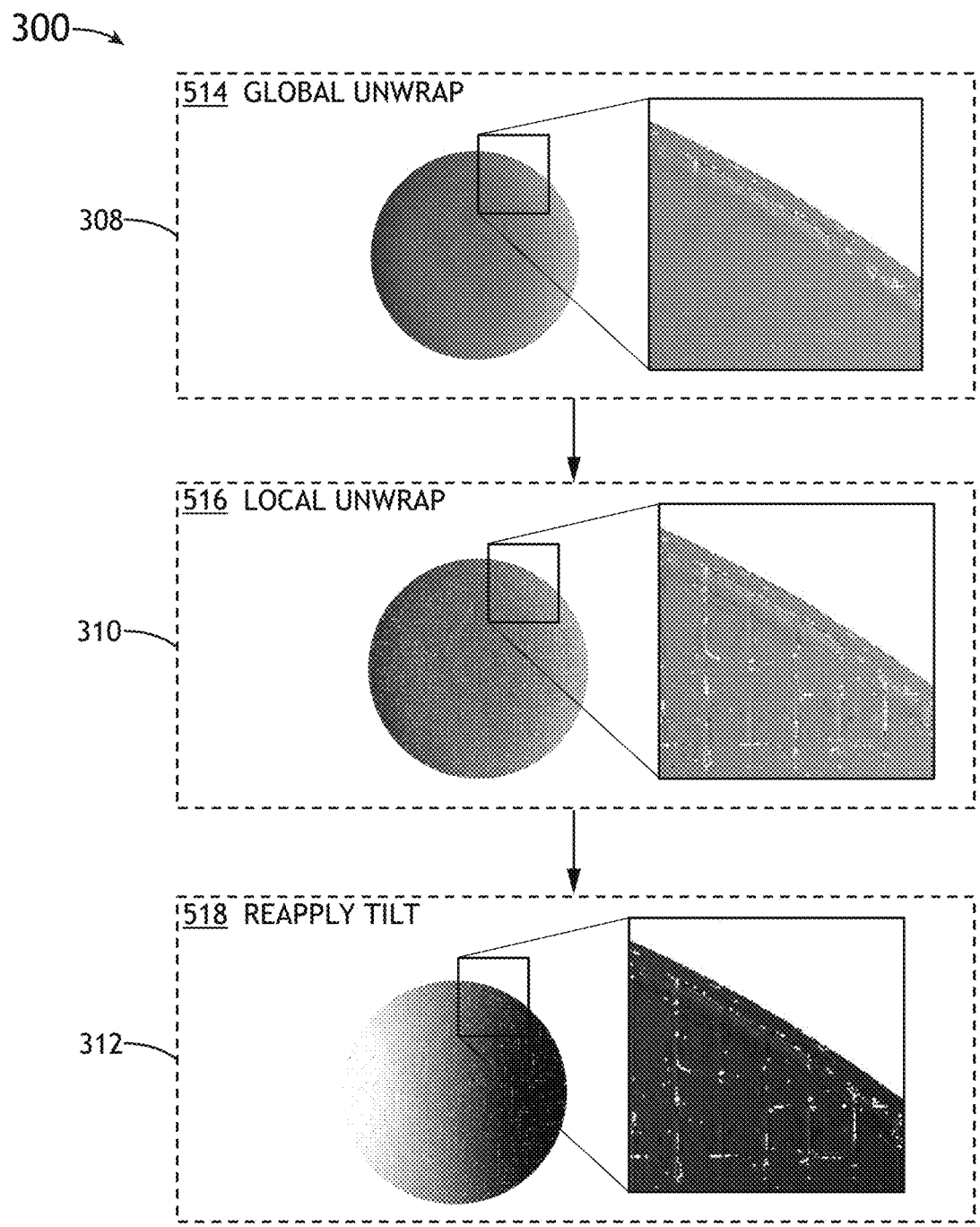
FIG. 5B illustrates a flow diagram including more phase maps of more steps of the method of FIG. 5A, in accordance with one or more embodiments of the present disclosure.
Figure 6A:
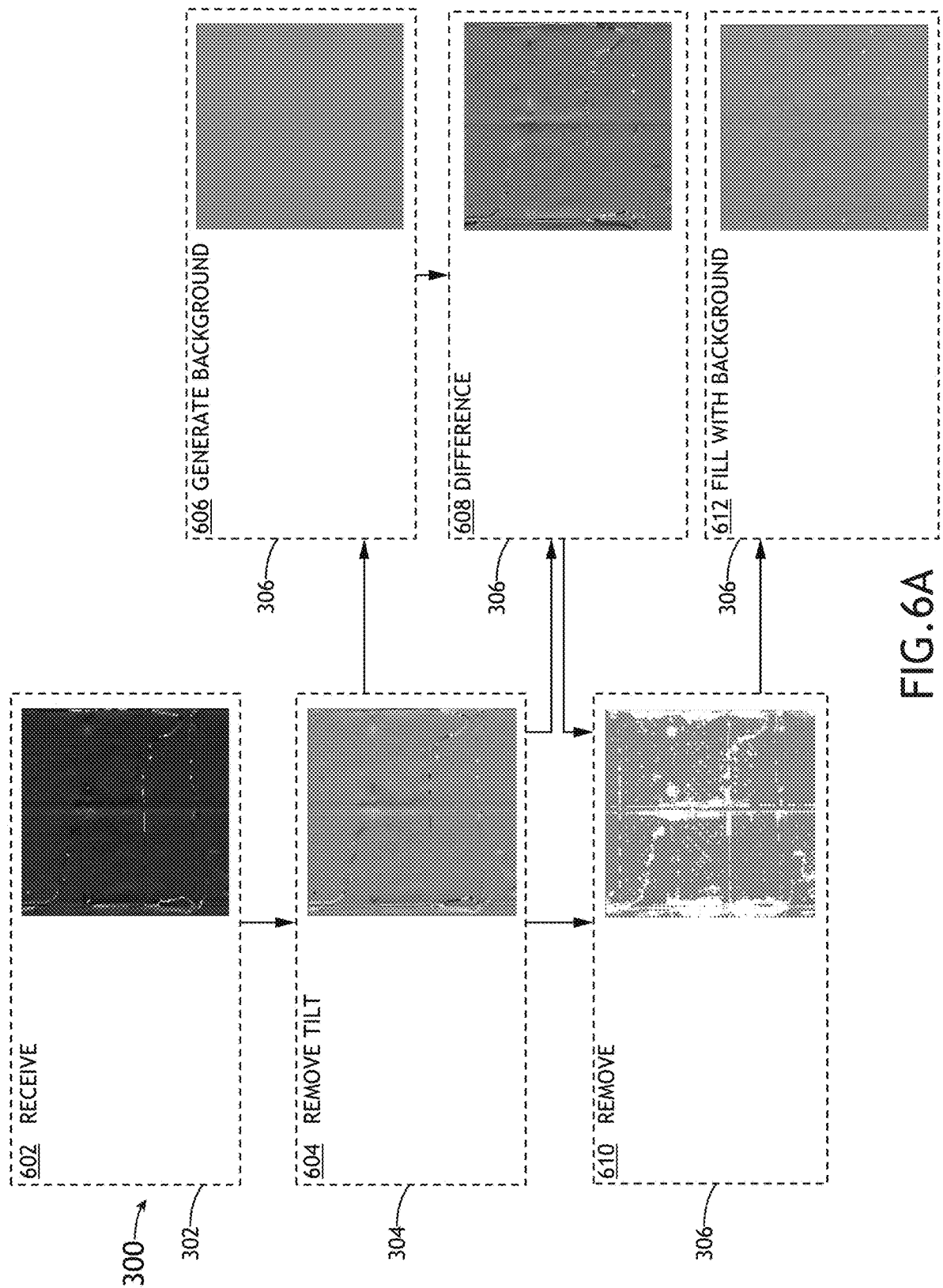
FIG. 6A illustrates a flow diagram including other examples of phase maps of the steps of FIG. 5A, in accordance with one or more embodiments of the present disclosure.
Figure 6B:
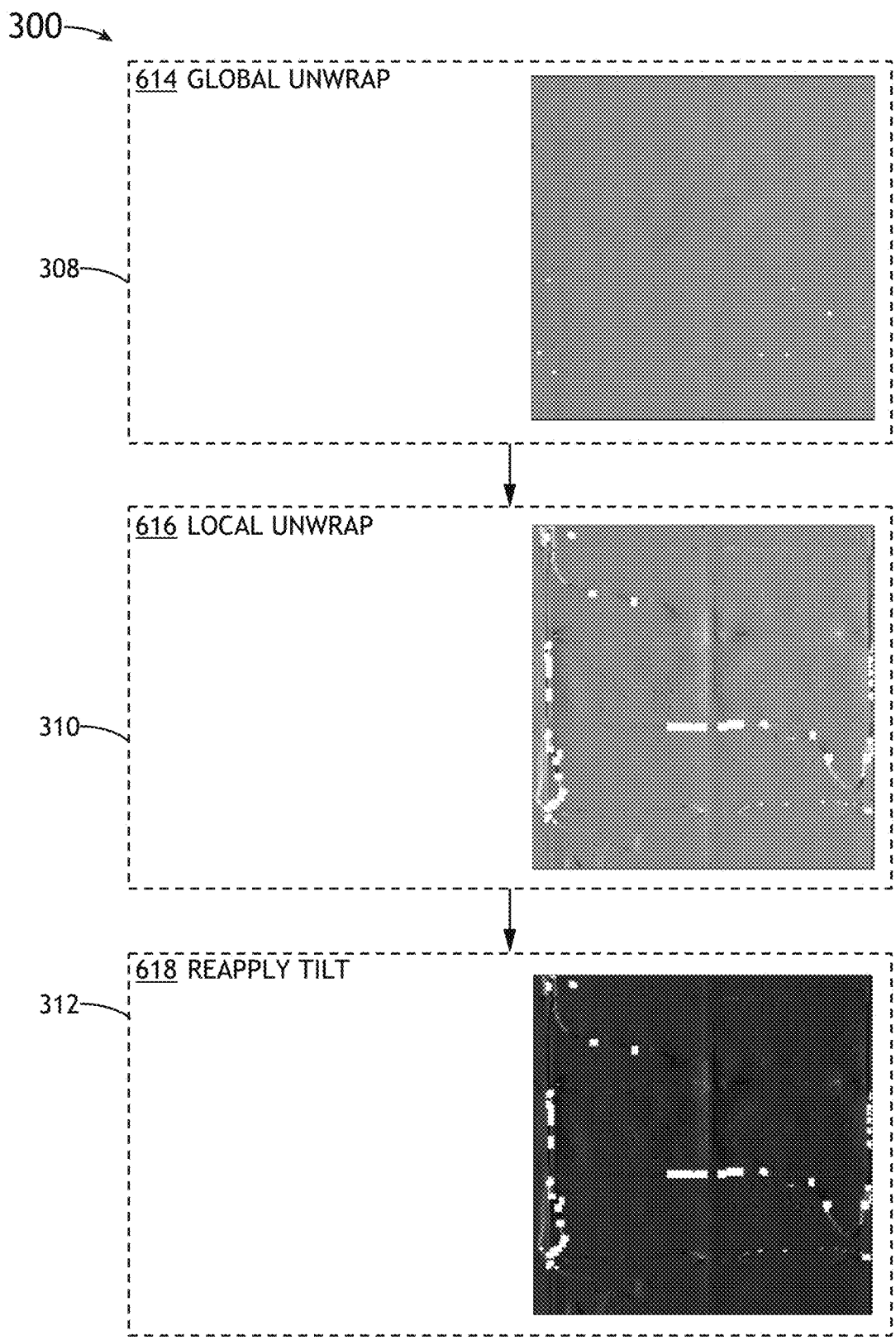
FIG. 6B illustrates a flow diagram including other examples of phase maps of the steps of FIG. 5B, in accordance with one or more embodiments of the present disclosure.

It is noted that method 300 may be better understood by, but is not limited by, reference to three example flow diagrams of steps 302-312, shown by schematic diagrams of FIGS. 4A-4C, phase maps of FIGS. 5A-5B, and phase maps of FIGS. 6A-6B. These three examples may illustrate various embodiments and examples of phase unwrapping.

FIG. 4A illustrates a cross sectional view of a schematic diagram of a wrapped phase map 104 of a sample 202, in accordance with one or more embodiments of the present disclosure. FIGS. 4B-4C illustrate flow diagrams including schematic diagrams of steps of method 300 for unwrapping a phase map, in accordance with one or more embodiments of the present disclosure. FIGS. 4B-4C may be better understood by reference to interferometric illustrative representations of features 402, as labeled in FIG. 4A. Generally, phase unwrapping steps 302-312 of the present disclosure may be better understood by looking at the three examples of phase unwrapping shown in FIGS. 4A-6B.

At step 302, a wrapped phase map 104, 502 is received as shown in FIG. 5A. Note that wrapped phase map 602 is also an example of a wrapped phase map 104, 502 that may be received in step 302 and, generally, FIGS. 6A-6B provide alternative example phase maps to the phase maps shown in FIGS. 5A-5B for the same steps. It should be noted that it is not meant to be limiting that FIG. 4B does not illustrate step 302 or a schematic diagram of wrapped phase map 502, 602—rather a step 302 may still exist for FIG. 4B, but is merely not shown.

In embodiments, the wrapped phase map 502 received at step 302 may include features 402. For example, features 402 may be sharp/tall features defined as being associated with discontinuities of more than at least half a phase cycle (or more) from adjacent/proximate phase data, features creating ambiguous discontinuities in wrapped phase map data, NAND features, and/or the like. For example, a wrapped phase map 502 associated with an interferometric measurement of a sample 202 including patterned features may be received.

Note that for purposes of brevity, schematic diagrams in FIGS. 4A-4C may be referred to as "phase maps" and the like such as in language similar to "phase map 504, 412, 604", even though such schematic diagrams are 2 dimensional.

At step 304, a tilt is removed from the wrapped phase map 502, 602. Such removal may be illustrated by diagram 412 of FIG. 4B, wrapped phase map 504 of FIG. 5A, and wrapped phase map 604 of FIG. 6A. For example, the sample 202 may be tilted such that a received wrapped phase map 502, 412, 602 exists in a state that includes multiple phase cycles across the wrapped phase map 502, 412, 602 due to a tilt of the sample 202 relative to the imaging system 204 of the system 200.

In some embodiments, removing a tilt (i.e., removing a linear component, linear signal, dominant linear component, and/or the like) may be any step that removes a linear component of the surface topology of a sample 202. For example, such removal may be done mathematically and/or mechanically by sample rotation. In some embodiments, the tilt may be an overall tilt of the entire sample 202. For example, a tilt may be a single angle measured from the highest point on the outer edge of a sample 202 to a point opposite the highest point on the opposite edge of a sample 202—measured relative to a direction the imaging system 204 considers to be "level", e.g., parallel to gravity, an optical axis of the imaging system 204, or the like. For example, an overall tilt is illustrated by an angled schematic diagram 426 compared to a level diagram 424.

In at least some embodiments, a tilt is determined and removed based on a directional slope technique. For example, a slope difference in the Y-direction may be Dz/Dy, and a slope difference in the X-direction may be Dz/Dx. Dz/Dy may be the change in height of the surface in the z-direction from pixel(i) to pixel(i+N), where "i" is any pixel and N is a number of pixels. A median value of Dz/Dx and Dz/Dy is then determined of values across an X-direction and Y-direction, respectively, of a sample/wafer 202. Such median values are representative of the tilt estimation of the sample 202 in an X-direction and Y-direction. Next, such median values may be used to remove the tilt of the wrapped phase map 502.

Note that a Z direction for the above example is a direction normal to a surface of the wafer such that the wafer shown in Example 2-116 of FIG. 1A is in an X-Y plane.

In some embodiments, the tilt may be more than a simple slope. For example, a tilt can be varying slope, averaged height map, a surface topology, a surface slope, a pseudo-thickness, a bow, and/or the like. For example, a tilt may be measured across the entire sample 202 or a portion of the sample 202. Such a tilt may, in some embodiments, be mathematically smoothed, flattened, averaged, fit to a mathematical function/curve, and the like. In this regard, the tilt may be used to remove one or more "bows"/warps from the sample measurement.

In one example, a pseudo-thickness may be a thickness determined by calculating a difference between a frontside surface topology and a backside surface topology of a sample 202. It should be noted that while pseudo-thickness may be used, it is not required in at least some embodiments of the present disclosure. Generally, at least one detriment of using pseudo-thickness is that pseudo-thickness may introduce inaccuracies due to artifacts from the backside surface that are transferred to a calculated surface topology of the front surface.

At least one benefit of some embodiments of the present disclosure allows for not requiring pseudo-thickness during a tilt removal step 304 and thereby possibly avoiding transferring inaccuracies from the back surface.

In an optional step (not shown), removing a tilt from the wrapped phase map 502 includes: extracting a surface profile measurement from the wrapped phase map 502; and removing a linear signal from the surface profile measurement. For example, a tilt may be measured by the imaging system 204 by any technique and the wrapped phase map 502 may be adjusted mathematically to remove the tilt.

In an optional step (not shown), removing a tilt from the wrapped phase map 502 includes: extracting a surface slope measurement from the wrapped phase map 502; and removing a linear signal from the surface slope measurement.

In an optional step (not shown), removing a tilt from the wrapped phase map 502 includes: extracting a thickness measurement from the wrapped phase map 502; and removing a linear signal from the thickness measurement.

At step 306, features 402 in the wrapped phase map 504 are detected and flattened. For example, flattening the features 402 may include a step of replacing the features 402 with background 506.

In some embodiments, features 402 may be illustrated by features 402 of FIG. 4A but it should be noted that FIG. 4A may be an exaggerated diagram for illustrative purposes and features 402 may be any shape or height. In embodiments, such features 402 correspond to at least some of the patterned features of the sample 202. For example, a physical patterned NAND feature of a sample 202 may correspond to a detected feature 402. For instance, the data/area of the phase map associated with the feature 402 may be associated with the physical patterned NAND feature because the feature 402 may represent (e.g., be, correspond to, be associated with) the physical patterned NAND feature. In embodiments, the features 402 may be sharp/tall features, features causing difficult-to-solve phase ambiguities, and the like. For example, the features 402 may be associated with step-wise phase changes in the wrapped phase map 504. For example, detecting features 402 in the wrapped phase map 504 may include detecting step-wise phase changes in the wrapped phase map 504 greater than a selected threshold (as shown in FIG. 4B). Such features 402 may be detected using a variety of techniques such as outlier detection in combination with outlier low pass filtering including median filtering, local averaging, and/or the like. Other techniques include local polynomial fitting, and the like. Further techniques include pattern-based outlier search based on prior knowledge, such as prior knowledge of pre-patterned wafer topology measurement, wafer design, die layout, and/or the like. For example, a wafer sample 202 may be designed to have sharp features 402 and such detecting of features 402 may be based upon prior knowledge. For example, a height threshold may be set and features 402 of a wafer/die design that meet/exceed such a threshold may be identified and their corresponding locations identified.

In some embodiments, step 306 may include sub-steps 306 as illustrated by schematic diagrams 414-418, phase maps 506-512, and phase maps 606-612. For example, such sub-steps 306 are labeled 306 in FIGS. 4B, 5A, and 6A and may include at least the following sub-steps: generate background sub-step 306, calculate difference sub-step 306, remove features sub-step 306, and/or fill with background sub-step 306.

At a generate background sub-step 306, a background 506, 414, 606 is generated which may be referred to as a background signal and the like. The background 506, 414, 606 may be relatively smooth relative to the wrapped phase map 504, 412, 604. In one example, the background 506, 414, 606 is generated based on prior design knowledge of the sample 202. In this regard, the background 506, 414, 606 may be an expected shape/topology of the sample 202 without unexpected sharp discontinuities.

In another example, the background 506, 414, 606 may correspond to the surface topology of the sample 202 if the sample had no or minimal features 402. For example, the background 506, 414, 606 may be limited to spatial frequencies below a threshold selected to exclude the features 402. For instance, the background 506, 414, 606 may represent a slowing changing topology of the sample 202 based on one or more measured layer heights of the sample 202. For example, such a topology, in some embodiments could be estimated based on measured heights of die edges/streets/cut-lines. In this regard, certain background topology information may be generated, such as one or more bows, each bow spanning one or more dies of the sample 202. For example, in embodiments, a background signal 506, 414, 606 is generated based on the wrapped phase map 504, 412, 604. In some embodiments, background 506, 414, 606 is in a wrapped state. It should be noted that background 506, 414, 606 (or portions thereof) may be referred to as "background", and other like terms, interchangeably, for purposes of the present disclosure.

At a calculate difference sub-step 306, a difference 508, 416, 608 is generated based on a calculable difference between the wrapped phase map 504, 412, 604 and the generated background 506, 414, 606. The difference 508, 416, 608 may be a flat (or nearly flat) phase map with certain background topology information such as bows of the wrapped phase map 504, 412, 604 corrected for but with features 402 still represented.

In some embodiments, the difference 508, 416, 608 is used to perform the detecting of the features 402. For example, as shown in FIG. 4B, a threshold may be set and may be used to determine corresponding locations of the sample 202 where features 402 are located. The corresponding locations may also be determined using any other method for determining features 402. For example, features 402 may be determined based on the chip design of the sample 202. In one example, features 402 are detected using a classic adaptive threshold technique. For example, the threshold may vary as a function of the background topology 414.

At a remove features sub-step 306, a pre-modified wrapped phase map 510, 610 may be determined/calculated using the corresponding locations of the features 402. For example, features 402 at the corresponding locations may be removed, as shown by white pixels of pre-modified wrapped phase map 510, 610.

At a fill with background sub-step 306, the background 506, 414, 606 is used to fill-in/replace the corresponding locations to generate a modified wrapped phase map 512, 418, 612. In this regard, sharp features 402 that may be likely to cause a failure of a global unwrapping of a phase map may be removed and replaced with portions of background 506, 414, 606 at the corresponding locations that closely matches surrounding phase map data. In this regard, step 306 may be referred to as "flattening", "detecting and flattening", and the like.

At step 308, a global phase-unwrapping technique is applied to the modified wrapped phase map 512, 418, 612. For example, phases of the modified wrapped phase map 512, 418, 612 may be unwrapped. In embodiments, such a global phase-unwrapping generates a temporary unwrapped phase map 514, 422, 614. It should be noted that step 308 may continue (directly and/or indirectly) from step 306, and step 308 is only shown in separate figures for clarity purposes and lack of space.

In this regard, a modified wrapped phase map 512, 418, 612 may be unwrapped to generate such a temporary unwrapped phase map 514, 422, 614. For example, any unwrapping technique may be used such as, but not limited to, techniques such as path finding techniques generally, preconditioned conjugate gradient techniques, region-growing algorithms, discontinuity minimization algorithms, minimum Lp-norm and least squares algorithms, quality-guided and network flow algorithms, branch-cut algorithms, flood-fill algorithms, and the like. In this regard, a (more accurate) temporary unwrapped phase map 514, 422, 614 may be generated and "failures" (e.g., failures 124 shown in FIG. 1B) caused by ambiguities of features 402 may be prevented.

At step 310, a local phase-unwrapping technique is applied to restore the phases of the features 402 at the corresponding locations of the temporary unwrapped phase map 514, 422, 614. Step 310 may result in phase maps 516, 424, 616. In embodiments, in a sense, the features 402 may be "added back" into the temporary unwrapped phase map 514, 422, 614 at corresponding locations (replacing the background), and local phase-unwrapping techniques (e.g., phase unwrapping applied individually at each corresponding location and/or at multiple corresponding locations) may be applied to the wrapped features 402 (previously removed features 402) to generate a fully unwrapped, feature-accurate version of a phase map of the sample 202. For example, applying local phase-unwrapping to restore the data of the detected features 402 removed in step 306 may include replacing the background 506, 414, 606 at the corresponding locations with the features 402. In this regard, areas not associated with the features 402 may be at reduced risk of failing to be properly unwrapped because the areas not associated with the features 402 may already be unwrapped in a global unwrapping step 308. For example, the method 300 may be configured to keep the areas besides the corresponding locations intact in step 310.

At step 310, any local phase unwrapping technique may be utilized. For example, local phase unwrapping techniques may be utilized such as are disclosed in U.S. Pat. No. 11,035,665 issued on Jun. 15, 2021, which is incorporated herein by reference in its entirety. For example, selecting and unwrapping a sub-set of pixels and related steps, as disclosed in U.S. Pat. No. 11,035,665, may be utilized herein to unwrap various corresponding locations of a phase map to accomplish "local unwrapping".

At step 312, the tilt is reapplied to the temporary unwrapped phase map 514, 422, 614 to generate an output unwrapped phase map 518, 426, 618.

At an optional step (not shown), a height map (not shown) is generated based on the output unwrapped phase map 518, 426, 618. For example, the height map may be used in a metrology analysis process.

Figure 7B:
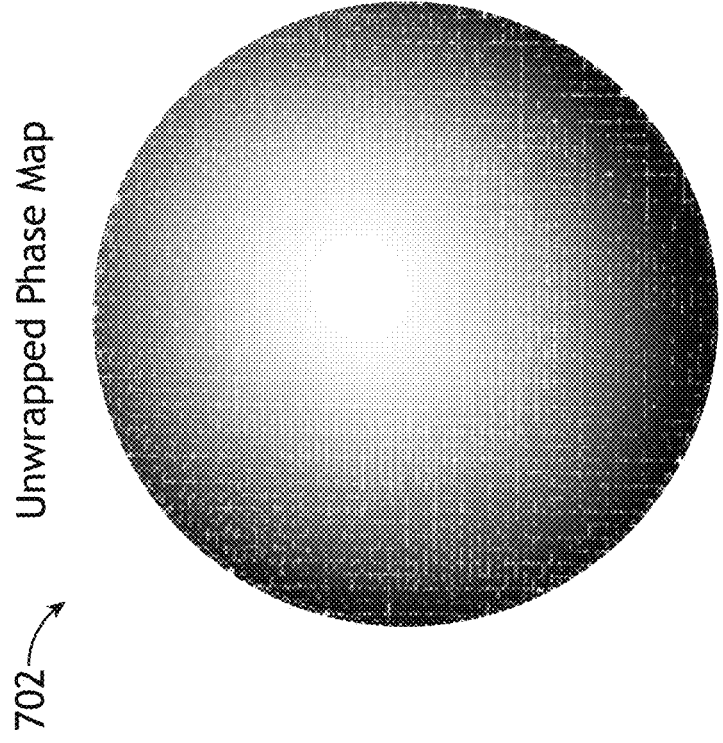
FIG. 7B illustrates a different unwrapped phase map of the sample of FIG. 7A, in accordance with one or more embodiments of the present disclosure.
Figure 7A:
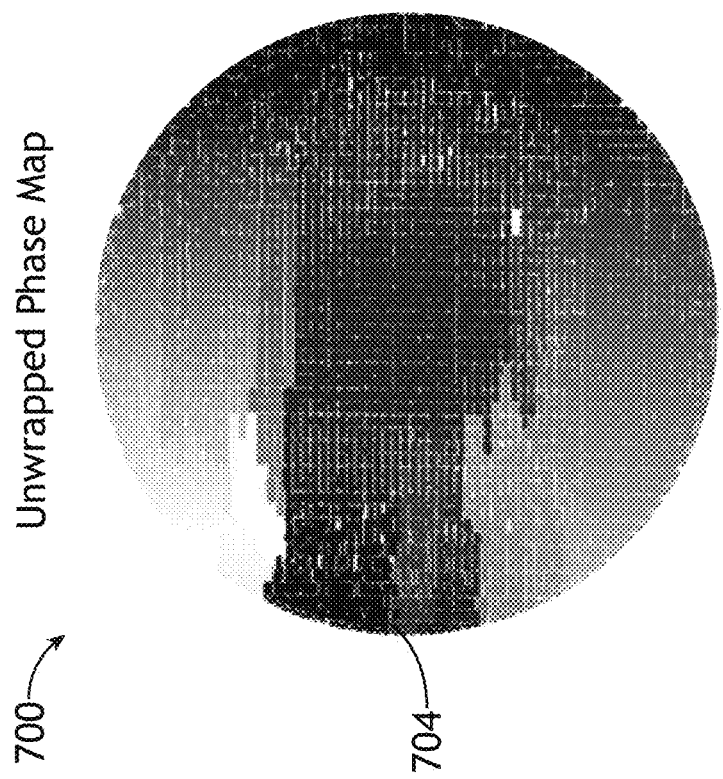
FIG. 7A illustrates an unwrapped phase map of a sample.

FIG. 7A illustrates an unwrapped phase map 700 of a sample 202 and FIG. 7B illustrates a different unwrapped phase map 702 of the sample 202 of FIG. 7A, in accordance with one or more embodiments of the present disclosure. For example, unwrapped phase map 702 of FIG. 7B may be obtained using at least some embodiments of the present disclosure compared to a partially failed unwrapped phase map 700 of FIG. 7A using other techniques. For example, areas of failed unwrapping 704 of phase ambiguities are shown.

Figures 8A, 8B:
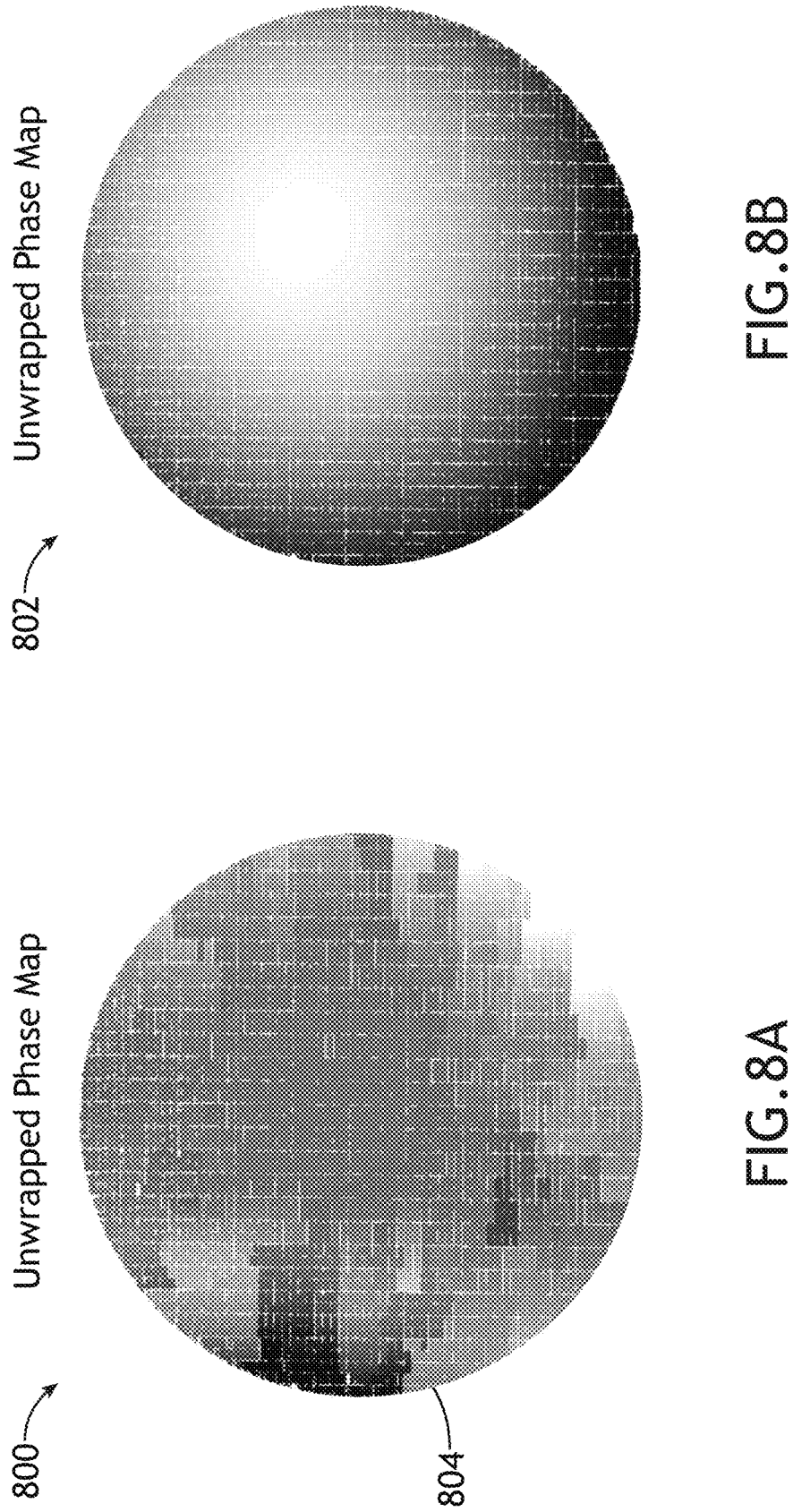
FIG. 8A illustrates an unwrapped phase map of a sample.
FIG. 8B illustrates a different unwrapped phase map of the sample of FIG. 8A, in accordance with one or more embodiments of the present disclosure.

FIG. 8A illustrates an unwrapped phase map 800 of a sample and FIG. 8B illustrates a different unwrapped phase map 802 of the sample of FIG. 8A, in accordance with one or more embodiments of the present disclosure. For example, unwrapped phase map 802 of FIG. 8B may be obtained using at least some embodiments of the present disclosure compared to a partially failed phase map 800 of FIG. 8A using other techniques. For example, areas of failed unwrapping 804 of phase ambiguities are shown.

Referring again to FIG. 2, embodiments of various components are described in additional detail.

As noted previously herein, the controller 206 of system 200 may include one or more processors 210 and memory 212. The memory 212 may include program instructions configured to cause the one or more processors 210 to carry out various steps of the present disclosure.

In another embodiment, the display of the user interface 216 may be configured to display data of system 200 to a user.

As noted previously herein, the one or more processors 210 of the controller 206 may be communicatively coupled to memory 212, wherein the one or more processors 210 may be configured to execute a set of program instructions maintained in memory 212, and the set of program instructions may be configured to cause the one or more processors 210 to carry out various functions and steps of the present disclosure.

It is noted herein that the one or more components of system 200 may be communicatively coupled to the various other components of system 200 in any manner known in the art. For example, the one or more processors 210 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 206 may be communicatively coupled to one or more components of system 200 via any wireline or wireless connection known in the art.

In one embodiment, the one or more processors 210 may include any one or more processing elements known in the art. In this sense, the one or more processors 210 may include any microprocessor-type device configured to execute software algorithms and/or instructions. In one embodiment, the one or more processors 210 may consist of a desktop computer, mainframe computer system, workstation, image computer, parallel processor, or other computer system (e.g., networked computer) configured to execute a program configured to operate the system 200, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 210. In general, the term "processor" may be broadly defined to encompass any device having one or more processing elements, which execute program instructions from memory 212. Moreover, different subsystems of the system 200 (e.g., interferometry tool 214, controller 206, user interface 216, and the like) may include processor or logic elements suitable for carrying out at least a portion of the steps described throughout the present disclosure. Therefore, the above description should not be interpreted as a limitation on the present disclosure but merely an illustration.

The memory 212 may include any storage medium known in the art suitable for storing program instructions executable by the associated one or more processors 210 and the data received from the system 200. For example, the memory 212 may include a non-transitory memory medium. For instance, the memory 212 may include, but is not limited to, a read-only memory (ROM), a random-access memory (RAM), a magnetic or optical memory device (e.g., disk), a magnetic tape, a solid-state drive and the like. It is further noted that memory 212 may be housed in a common controller housing with the one or more processors 210. In an alternative embodiment, the memory 212 may be located remotely with respect to the physical location of the processors 210, controller 206, and the like. In another embodiment, the memory 212 maintains program instructions for causing the one or more processors 210 to carry out the various steps described through the present disclosure.

In one embodiment, the user interface 216 is communicatively coupled to the controller 206. The user interface 216 may include, but is not limited to, one or more desktops, tablets, smartphones, smart watches, or the like. In another embodiment, the user interface 216 includes a display used to display data of the system 200 to a user. The display of the user interface 216 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 216 is suitable for implementation in the present disclosure. In another embodiment, a user may input selections and/or instructions responsive to data displayed to the user via a user input device of the user interface 216.

All of the methods described herein may include storing results of one or more steps of the method embodiments in memory 212. The results may include any of the results described herein and may be stored in any manner known in the art. The memory 212 may include any memory described herein or any other suitable storage medium known in the art. After the results have been stored, the results can be accessed in the memory 212 and used by any of the method or system embodiments described herein, formatted for display to a user, used by another software module, method, or system, and the like. Furthermore, the results may be stored "permanently," "semi-permanently," temporarily," or for some period of time. For example, the memory 212 may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A metrology system comprising:
a controller communicatively coupled to an interferometry tool, the controller including one or more processors configured to execute program instructions causing the one or more processors to:
receive a wrapped phase map associated with an interferometric measurement of a sample including patterned features;
remove a tilt from the wrapped phase map;
generate a background;
detect features in the wrapped phase map, wherein the features in the wrapped phase map correspond to at least some of the patterned features of the sample;
replace phases of the features with the background at corresponding locations in the wrapped phase map to generate a modified wrapped phase map;
unwrap the modified wrapped phase map using a global phase-unwrapping to generate a temporary unwrapped phase map;
apply local phase-unwrapping to restore the phases of the features of the temporary unwrapped phase map at the corresponding locations; and
reapply the tilt to the temporary unwrapped phase map to generate an output unwrapped phase map.

2. The metrology system of claim 1, wherein the remove the tilt from the wrapped phase map comprises:
extracting a surface profile measurement from the wrapped phase map; and removing a linear signal from the surface profile measurement.

3. The metrology system of claim 1, wherein the remove the tilt from the wrapped phase map comprises:
extracting a thickness measurement from the wrapped phase map; and
removing a linear signal from the thickness measurement.

4. The metrology system of claim 1, wherein the background is limited to spatial frequencies below a selected threshold, wherein the selected threshold is selected to exclude the features.

5. The metrology system of claim 1, wherein the background is based on prior knowledge of the sample.

6. The metrology system of claim 1, wherein the detect the features in the wrapped phase map comprises:
detecting step-wise phase changes in the wrapped phase map greater than a selected threshold.

7. The metrology system of claim 1, wherein the apply the local phase-unwrapping to restore the phases of the features comprises replacing the background at the corresponding locations with the features and unwrapping the features.

8. A metrology system comprising:
an interferometry tool; and
a controller communicatively coupled with the interferometry tool, the controller including one or more processors configured to execute program instructions causing the one or more processors to:
receive a wrapped phase map from the interferometry tool, wherein the wrapped phase map corresponds to an interferometric measurement of a sample including patterned features;
remove a tilt from the wrapped phase map;
generate a background;
detect features in the wrapped phase map;
replace phases of the features with the background at corresponding locations in the wrapped phase map to generate a modified wrapped phase map;
unwrap the modified wrapped phase map using a global phase-unwrapping to generate a temporary unwrapped phase map;
apply local phase-unwrapping to restore the phases of the features of the temporary unwrapped phase map at the corresponding locations; and
reapply the tilt to the temporary unwrapped phase map to generate an output unwrapped phase map.

9. The metrology system of claim 8, wherein the interferometry tool generates the wrapped phase map based on interference of a reference beam with light reflected from a surface of the sample.

10. The metrology system of claim 8, wherein the remove the tilt from the wrapped phase map comprises:
extracting a surface profile measurement from the wrapped phase map; and
removing a linear signal from the surface profile measurement.

11. The metrology system of claim 8, wherein the remove the tilt from the wrapped phase map comprises:
extracting a surface slope measurement from the wrapped phase map; and
removing a linear signal from the surface slope measurement.

12. The metrology system of claim 8, wherein the remove the tilt from the wrapped phase map comprises:
extracting a thickness measurement from the wrapped phase map; and
removing a linear signal from the thickness measurement.

13. The metrology system of claim 8, wherein the background is limited to spatial frequencies below a selected threshold, wherein the selected threshold is selected to exclude the features.

14. The metrology system of claim 8, wherein the background is based on prior knowledge of the sample.

15. The metrology system of claim 8, wherein the detect the features in the wrapped phase map comprises:
detecting step-wise phase changes in the wrapped phase map greater than a selected threshold.

16. The metrology system of claim 8, wherein the apply the local phase-unwrapping to restore the phases of the features comprises replacing the background at the corresponding locations with the features and unwrapping the features.

17. A metrology method comprising:
receiving a wrapped phase map associated with an interferometric measurement of a sample including patterned features;
removing a tilt from the wrapped phase map;
generating a background;
detecting features in the wrapped phase, wherein the features in the wrapped phase map correspond to at least some of the patterned features of the sample;

replacing phases of the features with the background at corresponding locations in the wrapped phase map to generate a modified wrapped phase map;

unwrapping the modified wrapped phase map using a global phase-unwrapping to generate a temporary unwrapped phase map;

applying local phase-unwrapping to restore the phases of the features of the temporary unwrapped phase map at the corresponding locations; and reapplying the tilt to the temporary unwrapped phase map to generate an output unwrapped phase map.

18. The metrology method of claim 17, wherein the removing the tilt from the wrapped phase map comprises:

extracting a surface profile measurement from the wrapped phase map; and removing a linear signal from the surface profile measurement.

19. The metrology method of claim 17, wherein the removing the tilt from the wrapped phase map comprises:

extracting a surface slope measurement from the wrapped phase map; and removing a linear signal from the surface slope measurement.

20. The metrology method of claim 17, wherein the removing the tilt from the wrapped phase map comprises:

extracting a thickness measurement from the wrapped phase map; and removing a linear signal from the thickness measurement.

21. The metrology method of claim 17, wherein the background is limited to spatial frequencies below a selected threshold, wherein the selected threshold is selected to exclude the features.

22. The metrology method of claim 17, wherein the background is based on prior knowledge of the sample.

23. The metrology method of claim 17, wherein the detecting the features in the wrapped phase map comprises:

detecting step-wise phase changes in the wrapped phase map greater than a selected threshold.

24. The metrology method of claim 17, wherein the applying the local phase-unwrapping to restore the phases of the features comprises replacing the background at the corresponding locations with the features and unwrapping the features.

* * * * *